US012457449B2

(12) United States Patent
Nielsen

(10) Patent No.: US 12,457,449 B2
(45) Date of Patent: Oct. 28, 2025

(54) AUDIO SIGNAL PROCESSING SYSTEM, LOUDSPEAKER AND ELECTRONICS DEVICE

(71) Applicant: GN AUDIO A/S, Ballerup (DK)

(72) Inventor: Jakob Birkedal Nielsen, Shandong (CN)

(73) Assignee: GN AUDIO A/S, Ballerup (DK)

( * ) Notice: Subject to any disclaimer, the term of this patent is extended or adjusted under 35 U.S.C. 154(b) by 250 days.

(21) Appl. No.: 18/257,255

(22) PCT Filed: Dec. 16, 2020

(86) PCT No.: PCT/CN2020/136801
§ 371 (c)(1), (2) Date: Jun. 13, 2023

(87) PCT Pub. No.: WO2022/126424
PCT Pub. Date: Jun. 23, 2022

(65) Prior Publication Data

US 2024/0048904 A1 Feb. 8, 2024

(51) Int. Cl.
*H04R 3/00* (2006.01)
*H04R 3/04* (2006.01)

(52) U.S. Cl.
CPC ............... *H04R 3/007* (2013.01); *H04R 3/04* (2013.01); *H04R 2430/01* (2013.01); *H04R 2430/03* (2013.01)

(58) Field of Classification Search
CPC ...... H04R 3/007; H04R 3/04; H04R 2430/01; H04R 2430/03; H04R 3/00; H03G 11/00; H03G 7/00

(Continued)

(56) References Cited

U.S. PATENT DOCUMENTS 10,331,400 B1 * 6/2019 Chen ........................ G06F 3/165
10,333,482 B1 * 6/2019 Shi ........................... H04R 3/04

(Continued)

FOREIGN PATENT DOCUMENTS

CN 1741517 A 3/2006
CN 106817655 A 6/2017

OTHER PUBLICATIONS

The extended European search report issued in European Application No. 20965442.5, dated Sep. 4, 2024.

(Continued)

*Primary Examiner* — Xu Mei
(74) *Attorney, Agent, or Firm* — HSML P. C.

(57) ABSTRACT

The present invention discloses an audio signal processing system, a loudspeaker and an electronics device. The audio signal processing system having a clipping threshold estimator, which receives an input audio signal and outputs at least one clipping threshold; and an audio processing unit, which receives the input audio signal, processes the input audio signal to control the non-linear distortion added to the input audio signal based on the clipping threshold and outputs an output audio signal to a loudspeaker driver, wherein the clipping threshold estimator includes: an extraction unit which extracts a set of features from the input audio signal; and a regression or classification unit which receives the set of features and converts the set of features into the at least one clipping threshold by using a regression or classification processing.

19 Claims, 4 Drawing Sheets

(58) Field of Classification Search
USPC ........ 381/55, 106, 94.5, 94.8, 120, 320–321
See application file for complete search history.

(56) References Cited

U.S. PATENT DOCUMENTS

| | | | | |
|---|---|---|---|---|
| 10,355,658 | B1 * | 7/2019 | Yang | H03G 9/025 |
| 2010/0030555 | A1 * | 2/2010 | Otani | G10L 21/02<br>704/224 |
| 2016/0019898 | A1 * | 1/2016 | Schreiner | G10L 21/0232<br>704/500 |
| 2016/0192070 | A1 * | 6/2016 | Bjoern-Josefsen | H04R 3/007<br>381/55 |
| 2018/0136899 | A1 * | 5/2018 | Risberg | H04R 3/04 |
| 2018/0367674 | A1 | 12/2018 | Schalk-Schupp et al. | |
| 2022/0046356 | A1 * | 2/2022 | Barkai | H04B 3/04 |

OTHER PUBLICATIONS

International Search Report and Written Opinion issued in PCT/CN2020/136801, dated Sep. 15, 2021, 6 pages provided.

* cited by examiner

AUDIO SIGNAL PROCESSING SYSTEM, LOUDSPEAKER AND ELECTRONICS DEVICE

FIELD OF THE INVENTION

The present invention relates to audio signal processing technical field, and more specifically, to an audio signal processing system, a loudspeaker and an electronics device.

BACKGROUND OF THE INVENTION

Improving the sound quality of audio devices is most often done using audio algorithms such as equalizers, dynamic range compressors and limiters to compensate for non-ideal capabilities of the loudspeakers including amplifiers in the devices. Often there is a desire to increase the loudness of a device by means of audio algorithms because it is impractical to do this by using larger loudspeakers and/or amplifiers capable of delivering higher output voltages.

When boosting the audio signal, the amplitude will not exceed the full-scale value. For signal processing in the digital domain, the full-scale value is the digital full-scale value, and for signal processing in the analogue domain, the full-scale value is in this context the maximum input voltage the amplifier can handle. One way of restricting the amplitude to the full-scale limit is to apply clipping. For many audio signals this will result in audible distortion and a degraded audio quality. A more common approach is to use a peak limiter which uses dynamic gain regulations to keep the signal within the full-scale limits. This approach will for many signals result in less audible distortion than the clipping approach but also reduced loudness compared to clipping and may introduce undesired audible signal modulation known as pumping.

In the area of music production, especially music mastering, a common method for maximizing loudness is to use a combination of peak limiting and clipping. For many music signals it is possible to apply clipping to some parts of the signal while keeping the amount of audible distortion within reasonable limits. This method cannot be directly utilized in the area of audio enhancement because it is highly content dependent and requires knowledge about when it is acceptable from a perceptual viewpoint to apply clipping.

Therefore, there is a demand in the art that a new solution for audio signal processing shall be proposed to address at least one of the problems in the prior art.

SUMMARY OF THE INVENTION

One object of this invention is to provide a new technical solution for audio signal processing.

According to a first aspect of the present invention, an audio signal processing system is provided, which comprises: a clipping threshold estimator, which receives an input audio signal and outputs at least one clipping threshold; and an audio processing unit, which receives the input audio signal, processes the input audio signal to control the non-linear distortion added to the input audio signal based on the clipping threshold and outputs an output audio signal to a loudspeaker driver, wherein the clipping threshold estimator includes: an extraction unit which extracts a set of features from the input audio signal; and a regression or classification unit which receives the set of features and converts the set of features into the at least one clipping threshold by using a regression or classification processing.

According to a second aspect of the present invention, a loudspeaker is provided, which includes: a loudspeaker driver; and the audio signal processing system according to an embodiment of this disclosure, wherein the audio signal processing system outputs the output audio signal to the loudspeaker driver According to a third aspect of the present invention, an electronics device including the loudspeaker according to an embodiment of this disclosure is provided.

According to an embodiment of this invention, the present invention can improve the performance of an audio processing system.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Figure 1:
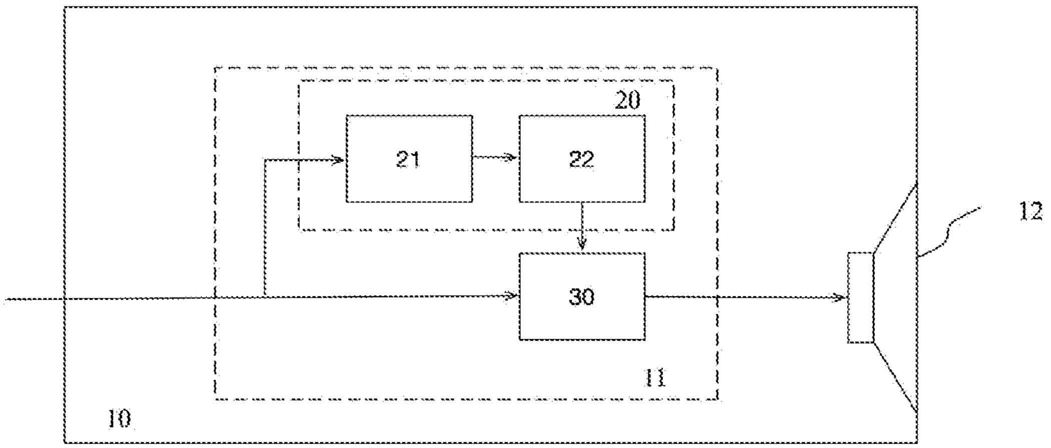
FIG. 1 is a schematic diagram showing a loudspeaker including an audio signal processing system according to an embodiment of this disclosure.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

FIG. 1 is a schematic diagram showing a loudspeaker including an audio signal processing system according to an embodiment of this disclosure.

As shown in FIG. 1, a loudspeaker 10 comprises an audio signal processing system 11 and loudspeaker driver 12. The audio signal processing system 11 outputs an output audio signal to the loudspeaker driver 12 for playing. Here, the loudspeaker driver 12 is for explaining the parts of the loudspeaker and may include other components, such as an amplifier, driving circuit, membrane and so on.

The audio signal processing system 11 comprises a clipping threshold estimator 20 and an audio signal processing unit 30.

The clipping threshold estimator 20 receives an input audio signal and outputs at least one clipping threshold. For example, the clipping threshold estimator 20 may output one clipping threshold for all frequency of the audio signal, or it can output multiple clipping thresholds, each of which is used for a specific frequency band of the input audio signal.

The audio processing unit 30 receives the input audio signal and processes the input audio signal to control the non-linear distortion added to the input audio signal based on the clipping threshold. The audio processing unit 30 processes the input audio signal to control peaks and clipping levels for the input audio signal based on the clipping threshold. Then, the audio processing unit 30 outputs an output audio signal to the loudspeaker driver 12 for playing.

As shown in FIG. 1, the clipping threshold estimator 20 includes an extraction unit 21 and a regression or classification unit. The extraction unit 21 extracts a set of features from the input audio signal. For example, the set of features may include at least one of the following features: energy distribution in a set of frequency bands of the input audio signal, crest factor for the input audio signal, spectral flatness for the input audio signal, spectral rolloff for the input audio signal, mel-frequency cepstral coefficients for the input audio signal, zero crossing rate for the input audio signal, and statistics of signal value distribution for the input audio signal. The regression or classification unit 22 receives the set of features and converts the set of features into the at least one clipping threshold by using a regression or classification processing.

In this disclosure, the clipping threshold estimator uses an estimator algorithm (regression or classification processing) to perform an analysis of an audio signal to estimate how much clipping can be applied to the signal while keeping the audible distortion below an acceptable level. The clipping threshold estimator 20 extracts features of the input audio signal and outputs clipping threshold based on the features of the input signal. The output of the estimator algorithm is a clipping threshold signal which states how much peaks in the audio signal can be reduced by means of clipping, limiting and so on. As such, the clipping threshold could be content-dependent on the input audio signal. The loudspeaker including such an audio signal processing system with a clipping threshold estimator can produce a clipping/limiting on the audio signal with reduced audible distortion and pumping feeling for a listener while increasing the loudness.

The regression or classification processing may include at least one of a processing using an artificial neutral network, a processing using a decision tree and a logistic regression processing. When producing a clipping threshold, the processing can take the content of the input audio signal into consideration by using the features therein.

The regression or classification unit 22 can be trained by using a training set of short audio chunks in advance. The short audio chunks have been clipped at various clipping thresholds and have been labelled by audible degrees. For example, listeners can label short audio chunks by stating how audible a clipping is for each audio chunk. That is, the clipping threshold is an estimate of how much clipping can be applied to the signal while keeping the audible distortion below an acceptable level.

Alternatively, the regression or classification unit 22 can be updated (trained) during the using of the loudspeaker. For example, one or more sensors can be used to capture the reactions of a listener when playing an audio signal with a recorded clipping threshold, and a processing unit can process the data obtained from the sensors and output an indication stating the possible audible feeling of the listener. Then, the recorded clipping threshold and the corresponding indication can be used to update the regression or classification unit. The sensors can include at least one of the following components: a camera which captures the reaction of the listener such as face expressions, a microphone which captures the reaction sound of the listener and a log record which records the operations by the listener on the volume key of the electronics device where the loudspeaker is located. These can continuously improve the audio signal processing system as a user uses the electronics device. The recorded clipping threshold and its corresponding indication can be sent to the manufacture entity via Internet and can be used to train other audio signal processing systems (audio signal processing system in later loudspeakers).

The clipping threshold estimator 20 can further receive update configuration data to update its regression or classification unit 22. As such, the clipping threshold estimator 20 is configurable and updatable to continuously improve the listening experiences for the listener.

For example, the clipping threshold estimator 20 outputs multiple clipping thresholds. Each clipping threshold is an estimate of how audible the clipping is when being applied in a specific frequency band of the input audio signal. The clipping threshold can be used as control inputs for an algorithm which splits the input signal into frequency bands, applies a boost to each band and reduces the peak amplitude in each band using clipping according to the supplied clipping thresholds. The clipping thresholds could also be used as control inputs for a multiband dynamic range compressor which uses the clipping thresholds to allow clipping in combination with the compression and gain applied in each frequency band.

Each clipping threshold can be calculated using a separate regression or classification unit 22 which can be trained in a similar manner as described in this disclosure. The clipping thresholds can also be estimated from the wideband clipping threshold using simpler means such as a multiplication factor for each band.

Figure 2:
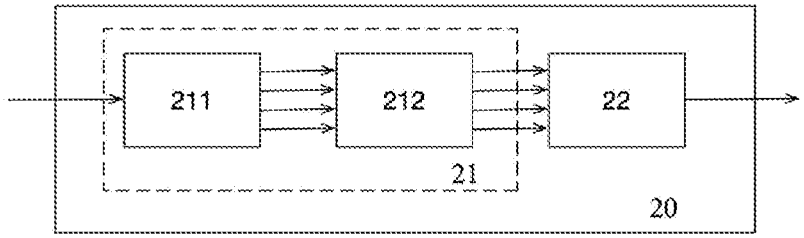
FIG. 2 is a schematic diagram of a clipping threshold estimator according to an embodiment of this disclosure.

FIG. 2 is a schematic diagram of a clipping threshold estimator according to an embodiment of this disclosure. In FIG. 2, the energy distribution includes normalized power values for the set of frequency bands. The extraction unit 21 includes a filter bank 211 and a normalizer 212. The filter bank 211 splits the input audio signal into the set of frequency bands. The normalizer 212 calculates the power values for the set of frequency bands and normalizes the calculated power values so that a sum of the normalized power values is equal to 1. The regression or classification processing unit 22 receives the normalized power values and converts the normalized power values into the at least one clipping threshold.

Figure 3:
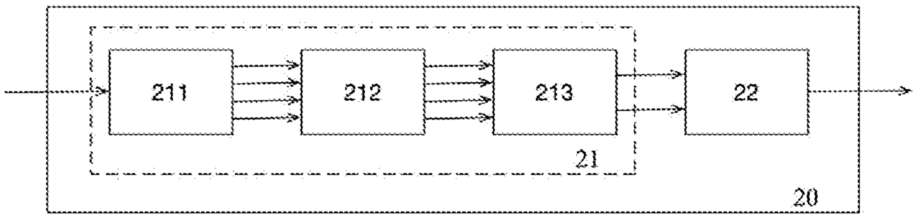
FIG. 3 is a schematic diagram of a clipping threshold estimator according to another embodiment of this disclosure.

FIG. 3 is a schematic diagram of a clipping threshold estimator according to another embodiment of this disclosure. In FIG. 3, the clipping threshold estimator 20 relies on the energy distribution across frequencies of the input audio signal. The extraction unit 21 includes a filter bank 211, a normalizer 212 and a minimum power selector 213. The filter bank 211 splits the input audio signal into the set of frequency bands. The filter bank 211 may have logarithmic spaced filters. The normalizer 212 calculates the power values for the set of frequency bands and normalizes the calculated power values so that a sum of the normalized power values is equal to 1. The minimum power selector 213 receives the normalized power values and outputs a first minimum normalized power value and a second minimum normalized power value, wherein the first minimum normalized power value is minimum for all of the set of frequency bands and the second minimum normalized power value is minimum for a set of higher frequency bands among the set of frequency bands. The set of higher frequency bands could be bands with frequencies higher than at least one frequency band of the input audio signal. The regression or classification processing unit 22 receives the first minimum normalized power value and the second minimum normalized power value and converts them into the at least one clipping threshold.

Generally, clipping introduced distortion in the form of harmonics and intermodulation distortion of the frequency components in the audio signal. How audible these distortion components are, depends on how they are masked by other frequency components already present in the audio signal. The audibility of applying clipping to an audio signal is therefore highly correlated with how the energy in the signal is distributed across frequencies. In general, clipping is highly audible if only a few tonal components are present in the signal and less audible if the signal is more noise alike. The inventor of this invention found that this could be used in clipping estimation.

If the input audio signal has a tonal character, the minimum power across all bands will be low (close to zero) and if the audio signal is broad band noise, the minimum power across all bands will be relatively high. In addition, the minimum band power for the higher bands will be relatively high if the input audio signal resembles high frequency noise in which case a high amount of clipping can be applied without being audible.

Here, the two minimum power values (the first minimum normalized power value for all frequency bands and the second minimum normalized power value for a set of the frequency bands covering higher frequencies of the input audio signal) can be used as features to estimate a clipping threshold. This clipping threshold can be used as is or combined with other features to improve the quality of the clipping threshold estimator 20.

Figure 4:
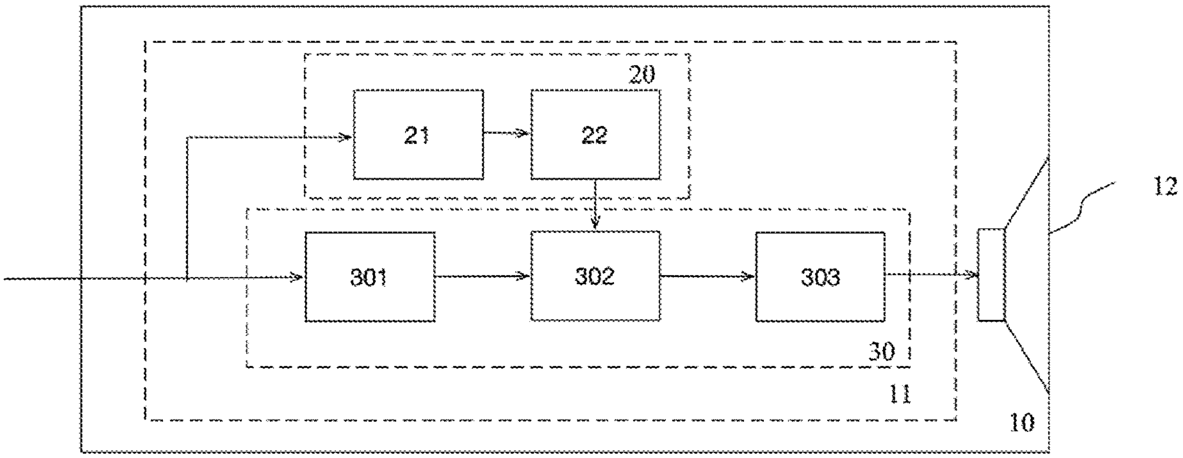
FIG. 4 is a schematic diagram showing a loudspeaker including an audio signal processing system according to another embodiment of this disclosure.

FIG. 4 is a schematic diagram showing a loudspeaker including an audio signal processing system according to another embodiment of this disclosure. The clipping threshold estimator 20 may be that described as above and thus the repeated description thereof is omitted here and after.

In FIG. 4, the audio processing unit 30 comprises a booster 301, a clipper 302 and a limiter 303. The booster 3011 boosts the input audio signal by a gain. The clipper 302 receives the clipping threshold and clips the boosted audio signal based on the clipping threshold. The limiter 303 limits the clipped audio signal.

In FIG. 4, the gain of the booster 301 can be a fixed gain. The clipping threshold estimator 20 controls the dynamic clipping level of the clipper 302 such that peaks which exceed full-scale are reduced by the clipping threshold (without reducing the peaks below full-scale). As an example, for a signal peak of 3 dBFS and a clipping threshold of 2 dB, the signal will be clipped at 3 dBFS−2 dBFS=1 dBFS. If the signal peak had been 1 dB, the signal would be clipped at 0 dBFS in order not to reduce the peak further than the full-scale level. By applying clipping prior to the limiter 303, less gain reduction is required by the limiter 303 and hereby higher signal level and thus loudness can be achieved. Also, pumping artefacts from gain regulations of the limiter 303 can be reduced. The clipping threshold is a real-time signal which changes according to the audio signal content.

Figure 5:
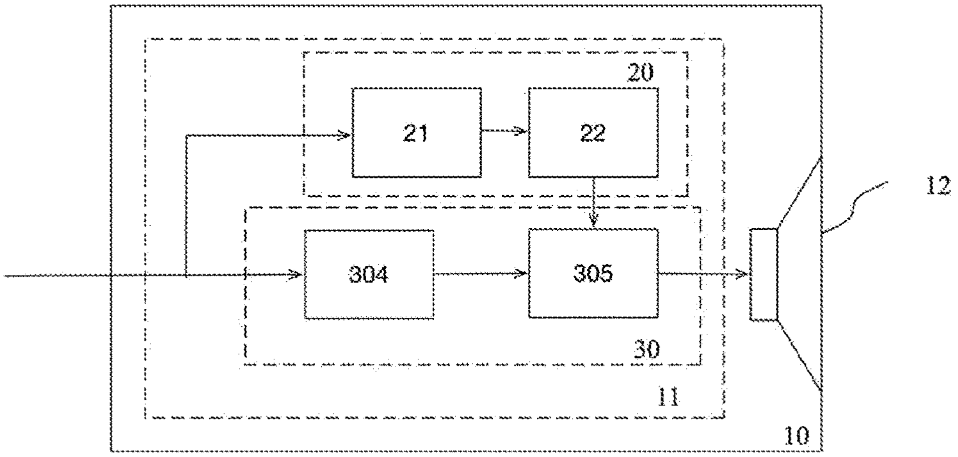
FIG. 5 is a schematic diagram showing a loudspeaker including an audio signal processing system according to another embodiment of this disclosure.

FIG. 5 is a schematic diagram showing a loudspeaker including an audio signal processing system according to another embodiment of this disclosure.

As shown in FIG. 5, the audio processing unit 30 comprises a dynamic booster 304 and a limiter 305. The dynamic booster 304 receives the input audio signal and boosts the input audio signal. The limiter 305 receives the clipping threshold and limits the boosted input audio signal based on the clipping threshold.

The dynamic booster 304 could be a compressor or multiband compressor. The clipping threshold estimated by the clipping threshold estimator 20 controls the maximum peak level in the limiter 305 such that peaks up to the clipping threshold are allowed in the output of the limiter 305.

In FIG. 5 a clipper is omitted since the limiter 305 has already adjusted the audio signal based on the clipping threshold. Otherwise, a clipper with a fixed clipping level at 0 dBFs can be used after the limiter 305.

Figure 6:
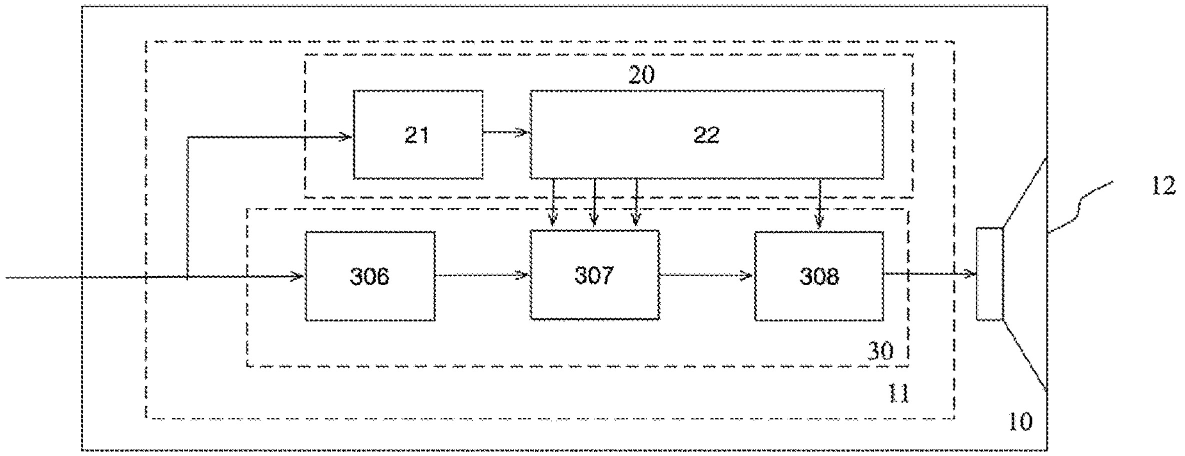
FIG. 6 is a schematic diagram showing a loudspeaker including an audio signal processing system according to another embodiment of this disclosure.

FIG. 6 is a schematic diagram showing a loudspeaker including an audio signal processing system according to another embodiment of this disclosure.

As shown in FIG. 6, the audio processing unit 30 comprises an equalizer 306, a multiband compressor 307 and a limiter 308. The equalizer 306 receives the input audio signal and equalizes the input audio signal. The multiband compressor 307 receives the clipping threshold and compresses the equalized audio signal based on the clipping threshold. The clipping thresholds received by the multiband compressor 307 may be all the clipping thresholds or part of the clipping thresholds produced by the clipping threshold estimator 20. Similarly, the clipping thresholds received by the limiter 308 may also be all the clipping thresholds or part of the clipping thresholds produced by the clipping threshold estimator 20.

Here, the equalizer 306 is used to compensate for a non-ideal frequency response of a loudspeaker in a device and a multiband compressor 307 is used to apply dynamic gains and clipping in a set of frequency bands to increase bass, treble and overall loudness. Dedicated clipping thresholds for each frequency band is provided by the clipping threshold estimator 20 to control how much clipping is allowed in each band in the multiband compressor. A wideband clipping threshold is supplied to the limiter 308. As explained above, a clipper may be placed after the limiter 308.

Figure 7:
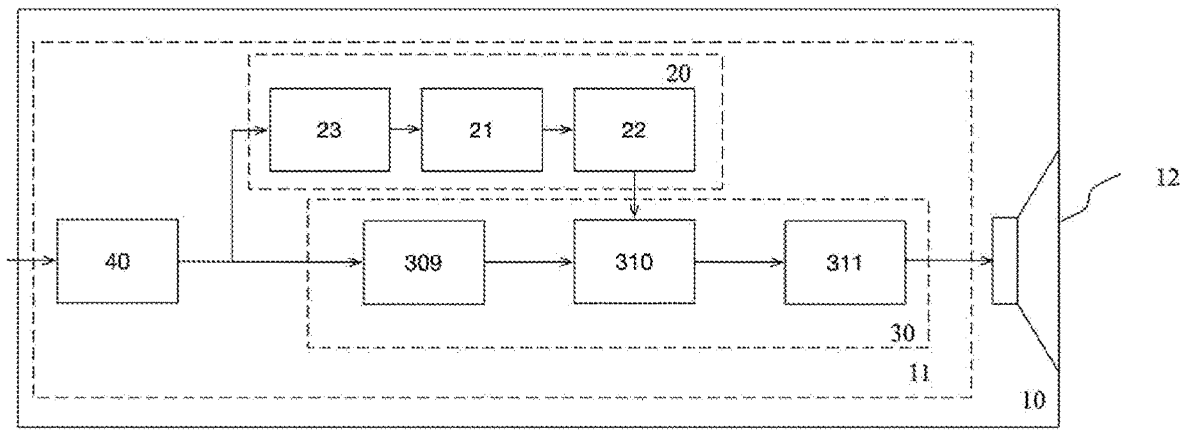
FIG. 7 is a schematic diagram showing a loudspeaker including an audio signal processing system according to another embodiment of this disclosure.

FIG. 7 is a schematic diagram showing a loudspeaker including an audio signal processing system according to another embodiment of this disclosure.

In FIG. 7, the audio signal processing system 11 further comprises an equalizer 40. The equalizer 40 receives the input audio signal and equalizes the input audio signal.

In FIG. 7, the audio processing unit 30 comprises a dynamic booster 309 and a limiter 310. The dynamic booster 309 receives the equalized input audio signal and boosts the equalized input audio signal. The limiter 310 receives the clipping threshold and limits the boosted audio signal based on the clipping threshold. The audio processing unit 30 may further include a clipper 311, which clips the limited audio signal. However, since the limiter 310 has already used the clipping threshold generated by the clipping threshold estimator 20 to limit the audio signal, the clipper 311 can be omitted.

In FIG. 7, the clipping threshold estimator 20 further comprises a transducer filter 23. The transducer filter 23 receives the equalized input audio signal and filters the equalized input audio signal to match a linear magnitude response for the loudspeaker driver. The extraction unit 21 unit extracts the set of features from the filtered audio signal.

Here, the input audio signal to the clipping threshold estimator 20 is filtered by a transducer filter 23 tuned to match the linear magnitude response of the loudspeaker driver 12. By taking the magnitude response of the loudspeaker driver into account, a clipping threshold that better matches the audio emitted by the loudspeaker 10 can be obtained because each frequency is weighted according to how it is reproduced by the loudspeaker 10. Hereby frequencies which cannot be reproduced (e.g. frequencies far below the resonance frequency of the loudspeaker) are not taken into account by the clipping threshold estimator 20. In FIG. 7, the output of the equalizer 40 which compensates for the non-ideal frequency response of the loudspeaker 10 is used as input to the transducer filter 23. Hereby any linear attempts to compensate for the loudspeaker magnitude response is captured in the input to the clipping threshold estimator 20. Ideally, the dynamic changes (by means of singleband or multiband compression) to the audio signal will also be present in the clipping threshold estimator input. Dynamic changes to the audio signal can affect the quality of the estimated clipping threshold. Instead, a mean magnitude response of the dynamic algorithms can be part of the transducer filter 23. Here, the used audio algorithms (linear equalizer and dynamic effects) in combination with the loudspeaker driver 12 can have a close to flat frequency response within the bandwidth of the loudspeaker driver 12.

Figure 8:
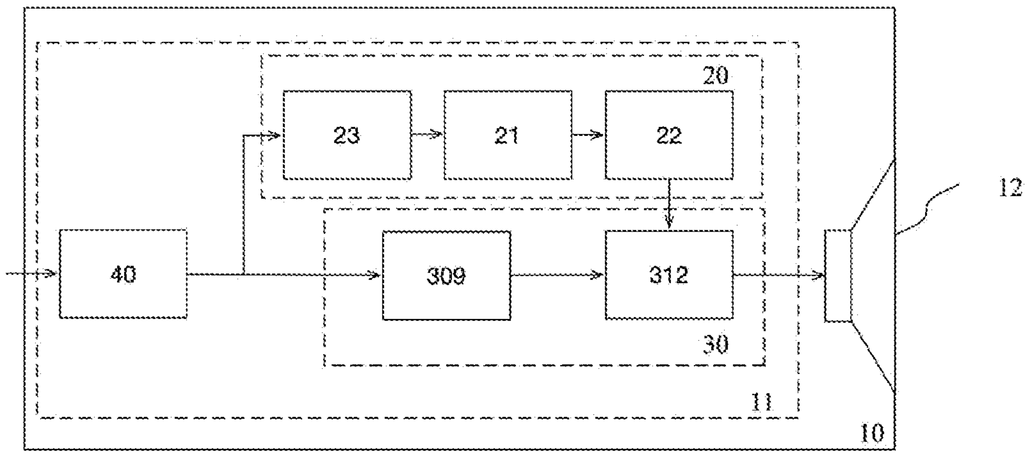
FIG. 8 is a schematic diagram showing a loudspeaker including an audio signal processing system according to another embodiment of this disclosure.

FIG. 8 is a schematic diagram showing a loudspeaker including an audio signal processing system according to another embodiment of this disclosure.

Similar with FIG. 7, in FIG. 8, the audio signal processing system 11 comprises an equalizer 40. The equalizer 40 receives the input audio signal and equalizes the input audio signal. In FIG. 8, the clipping threshold estimator 20 comprises a transducer filter 23. The transducer filter 23 receives the equalized input audio signal and filters the equalized input audio signal to match a linear magnitude response for the loudspeaker driver. The extraction 21 unit extracts the set of features from the filtered audio signal. The audio processing unit 30 comprises a dynamic booster 309, which receives the equalized input audio signal and boosts the equalized input audio signal.

In FIG. 8, the audio processing unit 30 comprises a displacement limiter 312. The displacement limiter 312 limits a displacement of a membrane of the loudspeaker driver by limiting low frequency components of the boosted audio signal, Here, the loudspeaker membrane displacement limiter 312 can be used to limit the displacement of the loudspeaker membrane by limiting the low frequency content of the audio signal. This can be done using a loudspeaker model which estimates the displacement of the membrane resulting from applying the audio signal. This could protect the loudspeaker driver when an amplifier is used, which can supply a high voltage output that would otherwise damage the loudspeaker membrane. Since most loudspeakers have a strong non-linear response when the membrane thereof is moved close to the limit, the loudspeaker will introduce non-linear distortion. It is therefore often necessary to set the membrane displacement limit lower than the safe limit to get an acceptable sound quality. As when applying clipping, the audibility of the loudspeaker induced distortion is very content dependent. By using the clipping threshold estimator 20 to control the membrane displacement limit, it is possible to let the loudspeaker operate in its non-linear mode and thus obtain higher loudness for audio content where the loudspeaker induced non-linear distortion is acceptable from a perceptual assessment.

The clipping used in the embodiments of this disclosure can be hard clipping or different types of soft clipping. Ideally, the labelled audio chunks used to train the regression or classification unit 22 in the clipping threshold estimator 20 can be created using the clipping type used in the audio processing. In practice, a simple multiplication factor can be applied to the clipping threshold to compensate for different clipping types.

The use of the clipping threshold estimator 20 is not limited to controlling peak and clipping levels. The clipping threshold estimator 20 can also be used to control other parameters which affects the amount of non-linear distortion added to the audio signal. For example, it can be attack and release times in a limiter.

Figure 9:
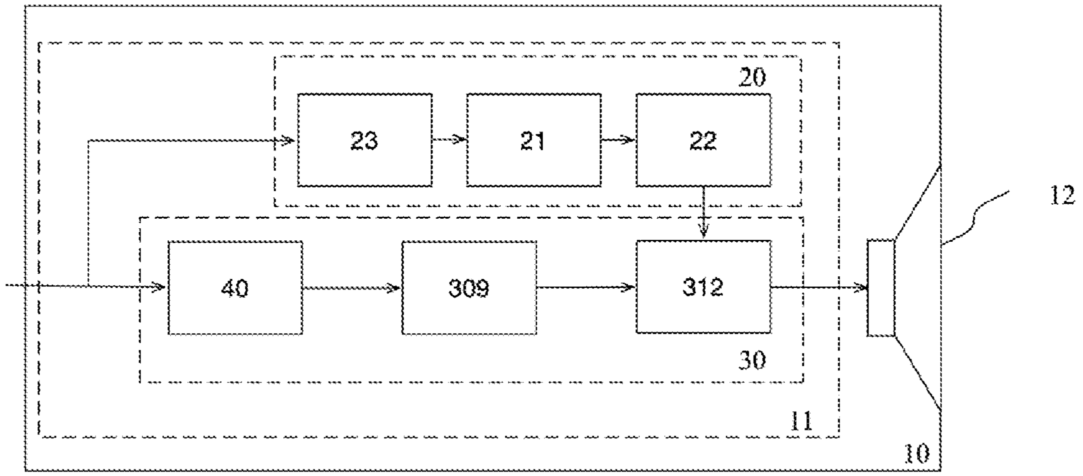
FIG. 9 is a schematic diagram showing a loudspeaker including an audio signal processing system according to another embodiment of this disclosure.

FIG. 9 is a schematic diagram showing a loudspeaker including an audio signal processing system according to another embodiment of this disclosure.

In FIG. 9, the input audio signal is directly input into the transducers filter 23. The transducers filter 23 can also be simplified to a lowpass or bandpass filter corresponding to the bandwidth of the loudspeaker driver 12. The input audio signal will be the unprocessed audio signal. The other components in FIG. 9 could be the same as or similar with those described above and thus the repeated description is omitted.

Figure 10:
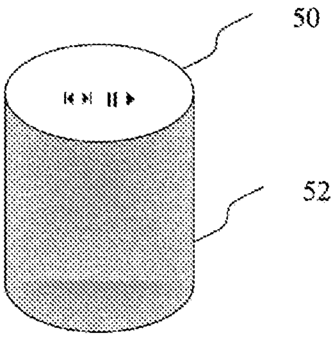
FIG. 10 is a schematic diagram showing an electronics device comprising a loudspeaker according to an embodiment of this disclosure.

FIG. 10 is a schematic diagram showing an electronics device comprising a loudspeaker according to an embodiment of this disclosure.

As shown in FIG. 10, the electronics device 50 includes the loudspeaker 52 as described above. The electronics device 50 may be a smart speaker, a smart TV, portable projector and so on.

Although some specific embodiments of the present invention have been demonstrated in detail with examples, it should be understood by a person skilled in the art that the above examples are only intended to be illustrative but not to limit the scope of the present invention.

What is claimed is:

1. An audio signal processing system, comprising:
a clipping threshold estimator, which:
receives an input audio signal, and
outputs at least one clipping threshold; and an audio processing unit, which:
receives the input audio signal, and
processes the input audio signal to control non-linear distortion added to the input audio signal based on the clipping threshold and outputs an output audio signal to a loudspeaker driver,
wherein the clipping threshold estimator comprises:
an extraction unit which extracts a set of features from the input audio signal; and
a regression or classification unit which receives the set of features and converts the set of features into the at least one clipping threshold by using a regression or classification processing,
wherein the set of features includes at least one of the following features: energy distribution in a set of frequency bands of the input audio signal, crest factor for the input audio signal, spectral flatness for the input audio signal, spectral rolloff for the input audio signal, mel-frequency cepstral coefficients for the input audio signal, zero crossing rate for the input audio signal, and statistics of signal value distribution for the input audio signal, and
wherein the energy distribution includes normalized power values for the set of frequency bands, and the extraction unit includes: a filter bank, which splits the input audio signal into the set of frequency bands; and a normalizer, which calculates the power values for the set of frequency bands and normalizes the calculated power values so that a sum of the normalized power values is equal to 1, wherein the regression or classification unit receives the normalized power values and converts the normalized power values into the at least one clipping threshold.

2. The audio signal processing system according to claim 1, wherein the regression or classification unit includes at least one of a processing using an artificial neutral network, a processing using a decision tree and a logistic regression processing.

3. The audio signal processing system according to claim 1, wherein the regression or classification unit is trained by using a training set of short audio chunks, which have been clipped at various clipping thresholds and have been labelled by audible degrees.

4. The audio signal processing system according to claim 1, wherein the regression or classification unit outputs multiple clipping thresholds, each of which is used for a specific frequency band of the input audio signal.

5. The audio signal processing system according to claim 1, wherein the audio processing unit processes the input audio signal to control peaks and clipping levels for the input audio signal based on the clipping threshold.

6. The audio signal processing system according to claim 1, wherein the audio processing unit comprises:
a booster, which boosts the input audio signal by a gain;
a clipper, which receives the clipping threshold and clips the boosted audio signal based on the clipping threshold; and
a limiter, which limits the clipped audio signal.

7. The audio signal processing system according to claim 1, wherein the audio processing unit comprises:
a dynamic booster, which receives the input audio signal and boosts the input audio signal; and
a limiter, which receives the clipping threshold and limits the boosted input audio signal based on the clipping threshold.

8. The audio signal processing system according to claim 1, wherein the audio processing unit further comprises:
an equalizer, which receives the input audio signal and equalizes the input audio signal;
a multiband compressor, which receives the clipping threshold and compresses the equalized audio signal based on the clipping threshold; and
a limiter, which receives the clipping threshold and limits the compressed audio signal based on the clipping threshold.

9. The audio signal processing system according to claim 8, wherein the regression or classification unit includes at least one of a processing using an artificial neutral network, a processing using a decision tree and a logistic regression processing.

10. The audio signal processing system according to claim 8, wherein the regression or classification unit is trained by using a training set of short audio chunks, which have been clipped at various clipping thresholds and have been labelled by audible degrees.

11. The audio signal processing system according to claim 1,
wherein the clipping threshold estimator further comprises;
a transducer filter, which receives the input audio signal and filters the input audio signal to match a linear magnitude response for the loudspeaker driver, and
wherein the extraction unit extracts the set of features from the filtered audio signal.

12. A loudspeaker including:
a loudspeaker driver; and
the audio signal processing system according to claim 1, wherein the audio signal processing system outputs the output audio signal to the loudspeaker driver.

13. An electronics device including the loudspeaker according to claim 12.

14. An audio signal processing system, comprising:
clipping threshold estimator, which:
receives an input audio signal, and
outputs at least one clipping threshold; and
an audio processing unit, which:
receives the input audio signal, and
processes the input audio signal to control non-linear distortion added to the input audio signal based on the clipping threshold and outputs an output audio signal to a loudspeaker driver,
wherein the clipping threshold estimator includes:
an extraction unit which extracts a set of features from the input audio signal; and
a regression or classification unit which receives the set of features and converts the set of features into the at least one clipping threshold by using a regression or classification processing,
wherein the extraction unit includes:
a filter bank, which splits the input audio signal into the set of frequency bands;
a normalizer, which calculates the power values for the set of frequency bands and normalizes the calculated power values so that a sum of the normalized power values is equal to 1; and
a minimum power selector, which receives the normalized power values and outputs a first minimum normalized power value and a second minimum normalized power value,
wherein the first minimum normalized power value is minimum for all of the set of frequency bands and the second minimum normalized power value is minimum for a set of higher frequency bands among the set of frequency bands, wherein the regression or classification unit receives the first minimum normalized power value and the second minimum normalized power value and converts them into the at least one clipping threshold.

15. The audio signal processing system according to claim 14, wherein the regression or classification unit includes at least one of a processing using an artificial neutral network, a processing using a decision tree and a logistic regression processing.

16. The audio signal processing system according to claim 14, wherein the regression or classification unit is trained by using a training set of short audio chunks, which have been clipped at various clipping thresholds and have been labelled by audible degrees.

17. The audio signal processing system according to claim 14, wherein the regression or classification unit outputs multiple clipping thresholds, each of which is used for a specific frequency band of the input audio signal.

18. An audio signal processing system, comprising:

clipping threshold estimator, which:

receives an input audio signal, and outputs at least one clipping threshold; and an audio processing unit, which:

receives the input audio signal, and processes the input audio signal to control non-linear distortion added to the input audio signal based on the clipping threshold and outputs an output audio signal to a loudspeaker driver, wherein the clipping threshold estimator includes:

an extraction unit which extracts a set of features from the input audio signal; and a regression or classification unit which receives the set of features and converts the set of features into the at least one clipping threshold by using a regression or classification processing, an equalizer, which receives the input audio signal and equalizes the input audio signal, wherein the audio processing unit comprises:

a dynamic booster, which receives the equalized input audio signal and boosts the equalized input audio signal; and a limiter, which receives the clipping threshold and limits the boosted audio signal based on the clipping threshold, wherein the clipping threshold estimator comprises a transducer filter, which receives the equalized input audio signal and filters the equalized input audio signal to match a linear magnitude response for the loudspeaker driver, and wherein the extraction unit extracts the set of features from the filtered audio signal.

19. An audio signal processing system, comprising:

clipping threshold estimator, which:

receives an input audio signal, and outputs at least one clipping threshold; and an audio processing unit, which:

receives the input audio signal, and processes the input audio signal to control non-linear distortion added to the input audio signal based on the clipping threshold and outputs an output audio signal to a loudspeaker driver, wherein the clipping threshold estimator includes:

an extraction unit which extracts a set of features from the input audio signal; and a regression or classification unit which receives the set of features and converts the set of features into the at least one clipping threshold by using a regression or classification processing;

an equalizer, which receives the input audio signal and equalizes the input audio signal, wherein the audio processing unit comprises:

a dynamic booster, which receives the equalized input audio signal and boosts the equalized input audio signal; and a displacement limiter, which limits a displacement of a membrane of the loudspeaker driver by limiting low frequency components of the boosted audio signal, wherein the clipping threshold estimator comprises;

a transducer filter, which receives the equalized input audio signal and filters the equalized input audio signal to match a linear magnitude response for the loudspeaker driver, and wherein the extraction unit extracts the set of features from the filtered audio signal.

* * * * *